US012251715B2

(12) United States Patent
Mueller

(10) Patent No.: US 12,251,715 B2
(45) Date of Patent: Mar. 18, 2025

(54) CENTRIFUGE BASKET

(71) Applicant: WMV Apparatebau GmbH, Windeck (DE)

(72) Inventor: Juergen Mueller, Sankt Augustin (DE)

(73) Assignee: WMV Apparatebau GmbH, Windeck (DE)

( * ) Notice: Subject to any disclaimer, the term of this patent is extended or adjusted under 35 U.S.C. 154(b) by 613 days.

(21) Appl. No.: 17/665,679

(22) Filed: Feb. 7, 2022

(65) Prior Publication Data

US 2022/0250090 A1 Aug. 11, 2022

(30) Foreign Application Priority Data

Feb. 5, 2021 (DE) ......................... 102021102757.8
Jul. 7, 2021 (EP) ..................................... 21184386

(51) Int. Cl.
*B04B 7/16* (2006.01)

(52) U.S. Cl.
CPC ...................................... *B04B 7/16* (2013.01)

(58) Field of Classification Search
CPC .... B04B 7/16; B04B 7/18; B05C 3/08; B05C 3/10
See application file for complete search history.

(56) References Cited

U.S. PATENT DOCUMENTS 2,416,475 A 2/1947 Friedman
3,379,632 A 4/1968 Henig
5,378,364 A * 1/1995 Welling .................... B04B 3/04 210/512.1
7,425,264 B2 * 9/2008 Reig ......................... B04B 7/18 210/232
10,252,194 B2 * 4/2019 Trench ...................... B04B 7/18
2003/0234214 A1 * 12/2003 Mullins ..................... B04B 7/18 210/360.1
2011/0006016 A1 * 1/2011 Gilles ....................... B04B 7/18 210/781

FOREIGN PATENT DOCUMENTS

| | | |
|---|---|---|
| DE | 1223223 | 8/1966 |
| DE | 202005005830 | 7/2005 |
| DE | 202005021235 | 7/2007 |
| DE | 102013109748 | 7/2014 |
| DE | 102017103127 | 8/2018 |
| DE | 102018111331 | 11/2019 |
| WO | 2003008081 | 1/2003 |

* cited by examiner

*Primary Examiner* — Dirk R Bass
(74) *Attorney, Agent, or Firm* — Burris Law, PLLC

(57) ABSTRACT

A centrifuge basket includes a support basket with a support base and a support wall circumferentially extending around a basket axis of the centrifuge basket. The support base and the support wall have a plurality of through openings with passage areas of at most 500 square millimeters, and a filter fabric which is arranged in the support basket and covers the support base and the support wall on the inside. The filter fabric includes, viewed in a cross-section through the centrifuge basket, a plurality of regions distributed over a circumference which are formed radially inwards with respect to a circular basic shape of the filter fabric.

15 Claims, 4 Drawing Sheets

CENTRIFUGE BASKET

CROSS-REFERENCE TO RELATED APPLICATIONS

This application claims priority to and the benefit of EP 21184386.7, filed on Jul. 7, 2021, and DE 10 2021 102 757.8, filed on Feb. 5, 2021. The disclosures of the above applications are incorporated herein by reference.

FIELD

The present disclosure relates to a centrifuge basket including a support basket and a filter fabric.

BACKGROUND

The statements in this section merely provide background information related to the present disclosure and may not constitute prior art.

A centrifuge basket can be used, in a manner known to those of skill in the art, for separating a treatment liquid, in such as a coating liquid, from bulk parts to be treated, such as screws, stamped parts or other small parts. For this, the centrifuge basket can first be immersed in an immersion bath in order to wet the bulk parts received in the centrifuge basket with the treatment liquid. In a subsequent centrifuging process, the centrifuge basket can be rotated by a centrifuge unit outside the immersion bath about an axis of rotation in order to centrifuge the treatment liquid, for example excess coating liquid, off the bulk parts. During rotation, centrifugal forces act not only on the centrifuge basket, but also on the bulk parts, which press against the basket wall of the centrifuge basket from the inside. The centrifuge basket may be rotated around an axis of rotation at rotational speeds between 15 and 250 revolutions per minute.

A centrifuge basket for coating small parts with a liquid coating agent is known from DE 10 2017 103 127 A1, the disclosure of which is incorporated herein by reference. The centrifuge basket consists of a filigree supporting skeleton and an insert of liquid-permeable material with wall and base, inserted therein.

Among other issues, stability and uniform treatment of some bulk parts can be difficult to achieve with typical centrifuge baskets.

SUMMARY

This section provides a general summary of the disclosure and is not a comprehensive disclosure of its full scope or all of its features.

The present disclosure provides a more stable centrifuge basket which ensures a uniform treatment of bulk parts with treatment liquid.

In one form according to the teachings of the present disclosure, a centrifuge basket includes: a support basket with a support base and a support wall extending circumferentially about a basket axis, with the support base and the support wall having a plurality of through openings with passage areas of not more than 500 square millimeters, and a filter fabric disposed in the support basket and internally covering the support base and the support wall, wherein the filter fabric includes, when viewed in a cross-section through the centrifuge basket, a plurality of regions distributed over the circumference which are formed radially inwards with respect to a circular basic shape of the filter fabric.

The through openings in the support wall and the support base are dimensioned such that the treatment liquid spun off the treated bulk parts upon rotation of the centrifuge basket about its basket axis or about a central axis of rotation of the centrifuge unit can be removed to the outside through the liquid-permeable support wall and/or the liquid-permeable support base, and that the filter fabric, which is also liquid-permeable, is adequately supported by the support wall and the support base. The passage area of the through openings, which may also be referred to as passage openings, is 500 square millimeters or less respectively. This maximum value may apply to some, most, or all passage openings and/or may also apply for an average value of the passage openings covered by the filter fabric. The liquid escapes through the openings of the support basket that may also be referred to as support cage. The filter fabric is inserted in the support basket and/or lines the support wall and the support base from the inside. Thus, due to the sandwich-like structure of the basket wall and the basket base, the centrifuge basket is permeable to liquids on the one hand and particularly stable and capable of bearing high loads, on the other. Bulk parts contained in the centrifuge basket are securely held therein during rotation.

The multilayer and/or sandwich-like basket wall includes the radially outer support wall, which serves to stabilize the centrifuge basket, and a wall-side portion of the filter fabric, which covers the support wall on the inside and serves to retain the bulk parts. The multilayer and/or sandwich basket base further includes the support base, which limits the centrifuge basket axially at the lower end, and a base-side portion of the filter fabric, which covers the support base on the inside and serves to retain the bulk parts.

The regions of the filter fabric formed or projecting radially inwards, respectively into the interior of the basket, can act as entrainers to entrain and/or circulate the bulk parts accommodated in the centrifuge basket during rotation thereof. This permits more uniform treatment with the treatment liquid, especially of complexly shaped bulk parts. Typical imperfections, such as liquid not being drained from the recesses in the screw heads, which can occur without circulation, can be reduced or eliminated by the raised regions of the filter fabric. As the filter fabric itself forms the radially inwardly raised regions, a continuous transition between the raised regions and the generally circular form of the filter fabric, respectively circular arc sections arranged between the raised regions, is achieved. Undercuts or the like on the wall surface of the centrifuge basket pointing inwards, in which the bulk parts could get caught during circulation, are avoided. This ensures better treatment and coating results.

Unless otherwise specified, indications relating to the “circumference” or the “circumferential direction” are in relation to the basket axis of the centrifuge basket. Likewise, terms such as “axial” and “radial” are to be understood as being in relation to the basket axis of the centrifuge basket.

The inwardly formed regions of the filter fabric may also be referred to as protruding or projecting regions, portions or areas. The regions may be spaced at regular angular intervals around the circumference. The form and distribution of the projecting regions can be configured according to the requirements. For example, the angular spacing between two adjacent projecting regions may be between 10 degrees and 180 degrees. The centrifuge basket includes at least one projecting region, and in one particular form, more than four projecting regions. The number of projecting regions may vary depending on the size of the centrifuge basket, in particular its inner diameter. In an exemplary construction, the centrifuge basket may have twelve or less projecting regions over the circumference, for example nine regions, in order to obtain an effective circulation and centrifuging of the bulk parts. In one form, the projecting regions may be formed only along a wall-side fabric portion of the filter fabric covering the support wall.

The filter fabric may include curved or circular arc sections, which are formed in circumferential direction between the radially inwardly projecting regions. The circular arc sections define the circular basic shape of the filter fabric. In particular, inner surfaces of the circular arc sections may define a reference circle forming the circular basic shape in a cross-sectional view. The circle may have a first radius to the basket axis. The projecting regions of the filter fabric may project radially inwardly up to a second circle having a second radius to the basket axis which is smaller than the first radius. The radially inwardly projecting regions can be convex relative to the concavely curved inner surfaces, and/or can be curved into the interior of the basket. As a result, the projecting regions protrude from the curved inner surfaces in an undulating manner, wherein rounded transitions between the inner surfaces and the projecting regions are formed. In particular, the protruding areas can be rib-like.

The wall-side portion of the filter fabric can be formed from a continuous fabric part that extends inside the basket over the entire circumference, respectively is closed in the circumferential direction. The two ends of the fabric wall portion may be welded together. The support base may be covered with a base-side fabric part of the filter fabric. A physical separation of the filter fabric into the wall-side fabric part and the base-side fabric part simplifies the production of the centrifuge basket. However, it is also possible that the filter fabric may have a pot-like shape and thus cover both the support wall and the support base as one continuous formed part.

According to one form, a thickness of the filter fabric may be smaller than a radial extension of a respective projecting region. The thickness of the filter fabric can be in a range of 1 to 4 millimeters. The filter fabric may be a wire mesh, in particular a fine mesh. The thickness of the filter fabric can be at least approximately twice the wire thickness of the weaving wires, and/or the sum of the wire thickness of the warp wire and the wire thickness of the weft wire. Furthermore, the radial extension of the respective projecting region can be at least 3 millimeters and at most 50 millimeters, and in one particular form is in a range of 4 to 10 millimeters. This allows the bulk parts to be circulated particularly well. The projecting regions of the filter fabric form bumps and/or a wave-like structure over which the bulk parts move in circumferential direction during centrifuging. This causes the bulk parts to be rearranged, which leads to good circulation and good spinning off of excess liquid from the bulk parts. However, it is understood that the radial extension of the projecting regions may also be larger, especially in the case of centrifuge baskets with a large internal diameter. A projecting region can have an extension in circumferential direction, i.e., a circumferential width, in a range of 2 to 50 millimeters, and in one particular form between 5 to 10 millimeters.

For effective circulation of the bulk parts in the centrifuge basket, the projecting regions can extend in the axial direction. In case where the receiving portion of the centrifuge basket is cylindrical, the projecting regions can thus extend parallel to the basket axis. In case where the receiving portion has a conical form, the projecting regions can be conically aligned accordingly. In principle, however, it is also possible for the projecting regions to be helically formed around the basket axes.

In one form, the axial extension of a respective projecting region may be greater than 0.5 times an axial extension of the support wall. A lower end of the projecting regions can be located at or close to the bottom of the support wall. This is advantageous because the centrifuge basket is usually aligned vertically before the centrifuging process. Due to gravity, the bulk parts initially accumulate on the bottom of the basket. As a result of the lower ends of the protruding regions extending to the base, the bulk parts may be circulated very effectively. The projecting regions may extend over the entire axial extent of the support wall. The projecting regions may be designed to be continuous in the axial direction, although they may also be interrupted.

According to one form, a plurality of structural elements may be provided circumferentially distributed on an inner side of the support basket, in particular of the support wall. The filter fabric nestles inside along the support wall provided with structural elements, so that in the areas of the structural elements the regions of the filter fabric are formed accordingly. The projecting regions of the filter fabric cover the structural elements on the inside and are supported thereagainst. This increases the stability of the so formed projecting regions. Buckling or indentation of the projecting regions by the bulk parts, which are exposed to centrifugal forces during rotation of the centrifuge basket, is thus reliably avoided. In addition or as an alternative to the structural elements, the filter fabric can have folds at the projecting areas or be pre-curved into the inwards projecting form.

The structural elements can be arranged radially outside the filter fabric and/or radially between the filter fabric and the support wall. In other words, the structural elements can be integrated into the basket wall. This improves the stability of the protruding areas of the filter fabric. The structural elements can be designed as bar profiles. This simplifies the manufacture of the centrifuge basket. The bar profiles can be elongated and include, for example, hollow profiles and/or solid profiles. The cross-section of the bar profiles can be round, angular, polygonal or the like.

The filter fabric can be firmly connected to the support basket, and in one particular form, can be welded. This increases the stability of the centrifuge basket. The filter fabric, which may also be referred to as filter mesh, can be made of a metal, and in one particular form, a weldable metal. A metal filter mesh can be made of a stainless steel, for example. The filter fabric can lie flat against the support wall of the support basket, at least in sections circumferentially adjacent to and/or between the protruding regions. Furthermore, the filter fabric can rest or lie flat, in particular over the entire surface, on the supporting base.

In one form, the filter fabric can be made of, and respectively consist of a single formed part that may cover the support base and the support wall. Alternatively, the filter fabric may include two mesh parts, namely the wall-side mesh part and the base-side mesh part. In particular, the filter fabric may be a fine mesh wire mesh, and in one particular form, be made of metal. The filter fabric can be produced by means of a twill weave, for example, which is particularly suitable for covering the curved, in particular cylindrical, support wall from the inside due to its flexibility. The filter fabric may also optionally be produced by means of another type of weave, such as a linen weave. Warp and weft threads of the filter fabric can be aligned at least substantially in the circumferential direction and parallel to the basket axis, respectively.

In order to retain the bulk parts inside the basket and to separate the excess treatment liquid during rotation of the centrifuge basket, the filter fabric can be a mesh fabric or open wire fabric with openings or meshes formed between wires woven at a distance. The wires may have a circular cross-section. The filter fabric may have a mesh size of 0.5 to 1.5 millimeters and/or a wire thickness of 0.125 to 1.4 millimeters, for example. The wire thickness, or wire diameter, may change slightly due to the weaving process. The wire thickness thus corresponds to the diameter of the weaving wire, the wire thickness being measured before weaving.

The filter fabric can have an open screen area, also called screen opening degree, which can be between 15 and 50 percent. The open screen area refers to the proportion of the sum of all screen openings to the total area of the filter mesh. In one form, the open screen area is between 20 and 30 percent. In yet another form, the open screen area is about 25 percent. As a result, the filter fabric forms a relatively smooth surface on the inside, so that the bulk parts cannot snag on the filter fabric during circulation. In one specific example, the filter fabric can have a mesh size of at least about 1.0 millimeter and a wire thickness of at least about 1.0 millimeter, with the filter fabric being produced by means of twill weave. As a result, particularly small bulk parts, respectively very small parts, such as M3 screws, M4 screws, small washers or the like, can be treated particularly well in the centrifuge basket.

In order to provide stable support for the, in particular, fine-mesh filter fabric, webs of the support basket, between which the passage openings are formed, can have a web width of at least 2 millimeters and/or at most 10 millimeters. The open screen area of the support basket can be in a range from 40 to 70 percent. The open screen area refers to the proportion of the sum of all passage openings to the total area of the support wall and support base, respectively. Thus, a percentage of the area of the passage openings of the support basket may be in a range from 40 to 70 percent and a percentage of the area of the webs of the support basket may be in a range from 30 to 60 percent. The passage openings may be square, rectangular, round, polygonal or the like. In one form, the passage area of the respective passage opening may be at least 50 square millimeters. This ensures that the excess treatment liquid can be easily removed to the outside through the support basket.

The support basket, i.e., the support wall and/or the support base, can be made from coarse-meshed wire mesh. The open wire mesh has a plurality of meshes and may also be referred to as a mesh. The meshes are the passage openings of the support basket. The passage openings are formed between wires woven at spaced intervals. The wires may have a circular cross-section. The coarse-meshed wire mesh can be configured with a mesh size of 8 to 16 millimeters. This provides a particularly stable and low-wear support basket. In one form, the mesh size of the coarse-mesh wire fabric of the support basket can be at least approximately 12 millimeters. The passage area of a square mesh with the mesh size of 12 millimeters can accordingly be approximately 144 square millimeters. The coarse mesh wire fabric of the support basket may include first wires and second wires interwoven with each other in any suitable known manner. The first wires and the second wires may have a wire thickness of 2.5 to 6.3 millimeters. In one form, the wires have a wire thickness of at least about 4 millimeters. As a result, the support basket is particularly stable, so that it can also withstand the load multiples acting on the centrifuge basket and the bulk parts to be treated, particularly during centrifuging of the treatment liquid, which can amount to up to 100 times the acceleration due to gravity (i.e., 100*g or approximately 981 $m/s^2$).

Furthermore, the weave of the coarse-mesh fabric can be a linen weave and can also be configured as a square-mesh fabric. This makes the support basket easy to clean and also provides a good flow rate, so that the excess treatment liquid can be spun off well and removed to the outside. In principle, a rectangular mesh fabric is also possible, wherein a mesh size can be 8.0×10.0 millimeters, for example. The coarse mesh fabric of the support basket may have a relatively large open screen area, which may be between 40 percent and 70 percent, and in some forms can be between 50 and 60 percent, and in one example form is about 56 percent.

The coarse-meshed wire mesh of the support wall and the support base can be a punched mesh. The punched mesh may be configured to be smooth on one side, in particular it may have a flat, smooth side. The smooth side may face the inside of the basket, so that the filter fabric can rest flat on the smooth side of the coarse-mesh wire fabric. By single-sided cribbing of the wires, the warp and weft wires of the punched wire mesh lie in one plane at the crossing points. This makes it possible to provide the advantageously smooth underside. Alternatively, the coarse-meshed wire mesh can be a woven wire mesh or the like.

In one form, the coarse mesh wire fabric of the support wall may be oriented diagonally. In other words, the first wires and the second wires of the wire mesh of the support wall may include angles of 30 degrees to 60 degrees with respect to a parallel to the basket axis. In one example, the angle is at least about 45 degrees. It has shown that this oblique or diagonal orientation of the coarse mesh fabric makes the support wall more stable and able to withstand the forces, in particular the centrifugal forces acting on the bulk parts during spinning, without deforming or bulging.

According to one form, the outermost layer of the basket wall and/or the basket base may be constituted by the support basket. Furthermore, the innermost layer of the basket wall and/or the basket base may be constituted by the filter fabric. In one particular example, the basket wall and/or the basket base of the centrifuge basket can include exactly the two layers, namely the outermost layer in the form of the support basket and the innermost layer in the form of the filter fabric. Both layers are designed to be permeable to liquids.

For reinforcement, the support basket can have a support ring that can span the support wall from radially outside. An inner diameter of the support ring can be larger than an outer diameter of the support wall. The support ring can be tacked or welded to a base sided end of the support wall. Furthermore, the support base at its peripheral edge can be connected to the support wall, e.g., by welding.

Furthermore, the centrifuge basket can have a holding flange with an opening for loading and unloading the centrifuge basket with bulk parts. This simplifies the automated handling of the centrifuge basket. The holding flange can be used for releasably clamping or fastening the centrifuge basket to a basket holder of a centrifuge unit, by which the centrifuge basket rotatingly drivable about its basket axis or about the central axis of rotation. At its end remote from the base, the support wall can be connected to the retaining flange, e.g., by welding.

The basket axis is a longitudinal axis of the centrifuge basket. In operation, the centrifuge basket can be rotated about its basket axis. Alternatively, the centrifuge basket may be combined with a plurality of further centrifuge baskets to form a centrifuge basket arrangement. A centrifuge basket arrangement, in turn, may be rotatingly drivable about a central axis of rotation. The centrifuge baskets may be jointly attached to the holding or retaining flange of the centrifuge basket arrangement. The central axis of rotation may be located outside the centrifuge baskets, whereas the basket axes are located inside the centrifuge baskets. The basket axes may extend parallel to the axis of rotation.

Further, the retaining flange may define a retaining plane that is perpendicular to the basket axis. The first and second wires of the coarse-mesh fabric for the support wall can be attached to an underside of the retaining flange at an angle to the retaining plane, viewed in a radial direction to the basket axis. In one example, an angle of 30 to 60 degrees may be included between the first wires and the retaining plane, and the second wires and the retaining plane, respectively. The angle may be about 45 degrees, for example. The ends of the wires facing the retaining flange may be welded to the retaining flange.

The centrifuge basket can be designed for a maximum loading weight of more than 15 kilograms. The centrifuge basket can be configured to be loaded with bulk parts whose total weight may be in a range of 30 to 100 kilograms, and in one particular example, for a loading weight of about 55 to 65 kilograms. The tare weight of the centrifuge basket can be between 40 and 100 kilograms, and in one particular example, between 45 and 60 kilograms.

The centrifuge basket can have an outer diameter of 300 to 350 millimeters. This may apply in particular for a construction where the centrifuge basket is part of a multi-basket arrangement in which, for example, three of the centrifuge baskets are combined to form the basket arrangement and to be attached to a common holding flange. Furthermore, the centrifuge basket may have a height of 300 to 380 millimeters.

In one example, the centrifuge basket may have a receiving or chamber volume of 20 to 35 liters. For example, the volume of the centrifuge basket can be approximately 26 liters, with deviations of +/− 10 percent being included. In a construction where the centrifuge basket is a so-called single basket, it can also have an outer diameter of 450 to 650 millimeters. For example, the outer diameter of the basket can be approximately 520 millimeters, with deviations of +/− 10 percent being included. Furthermore, the centrifuge basket can have a height of 300 to 420 millimeters. For example, the height of the centrifuge basket can be approximately 360 millimeters, with deviations of +/− 10 percent being included. The centrifuge basket can have a receiving or chamber volume, of 20 to 35 liters. For example, the volume of the centrifuge basket can least approximately 30 liters, with deviations of +/− 10 percent being included.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
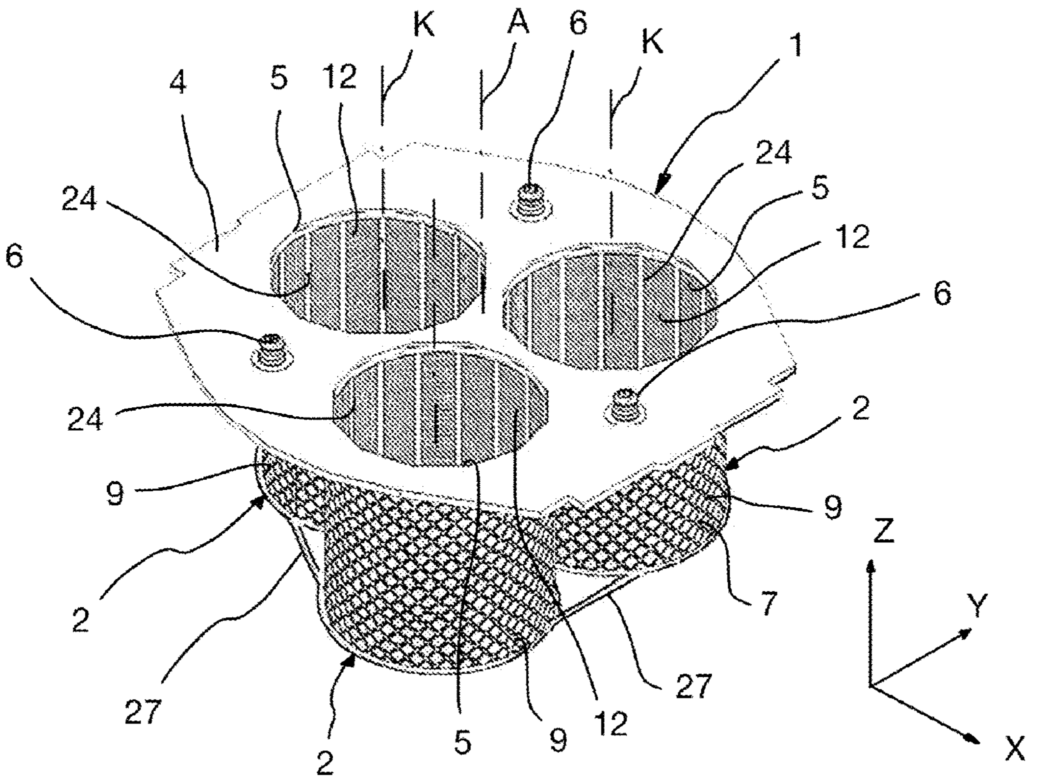
FIG. 1 is a top perspective view of three centrifuge baskets according to a first form of the teachings of the present disclosure, wherein the three centrifuge baskets are combined to form a centrifuge basket arrangement in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
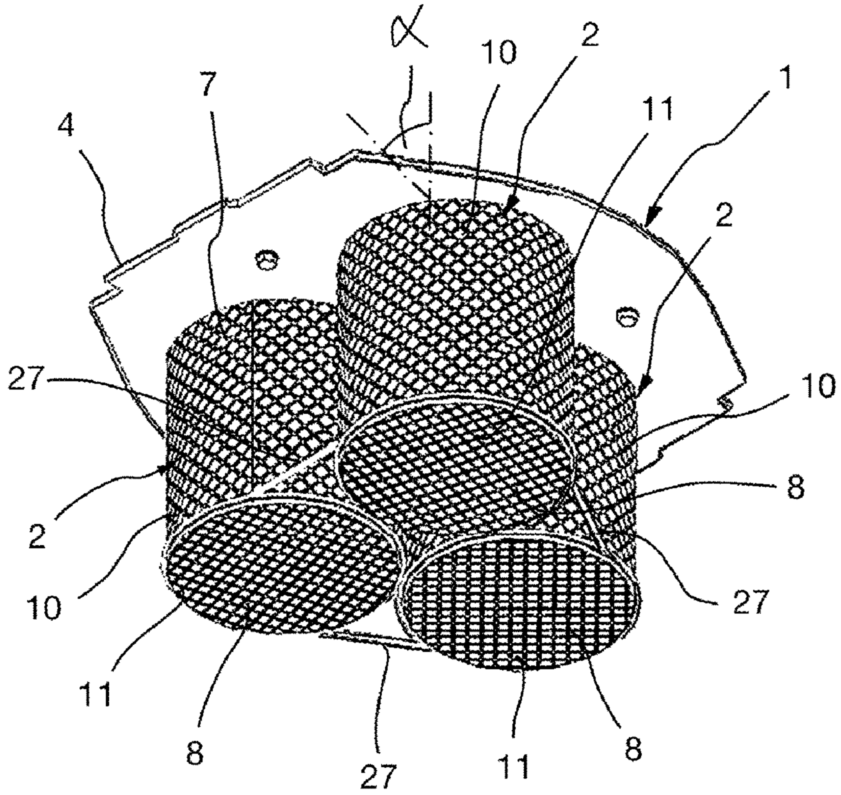
FIG. 2 is a bottom perspective view of the centrifuge baskets of FIG. 1.
Figure 8:
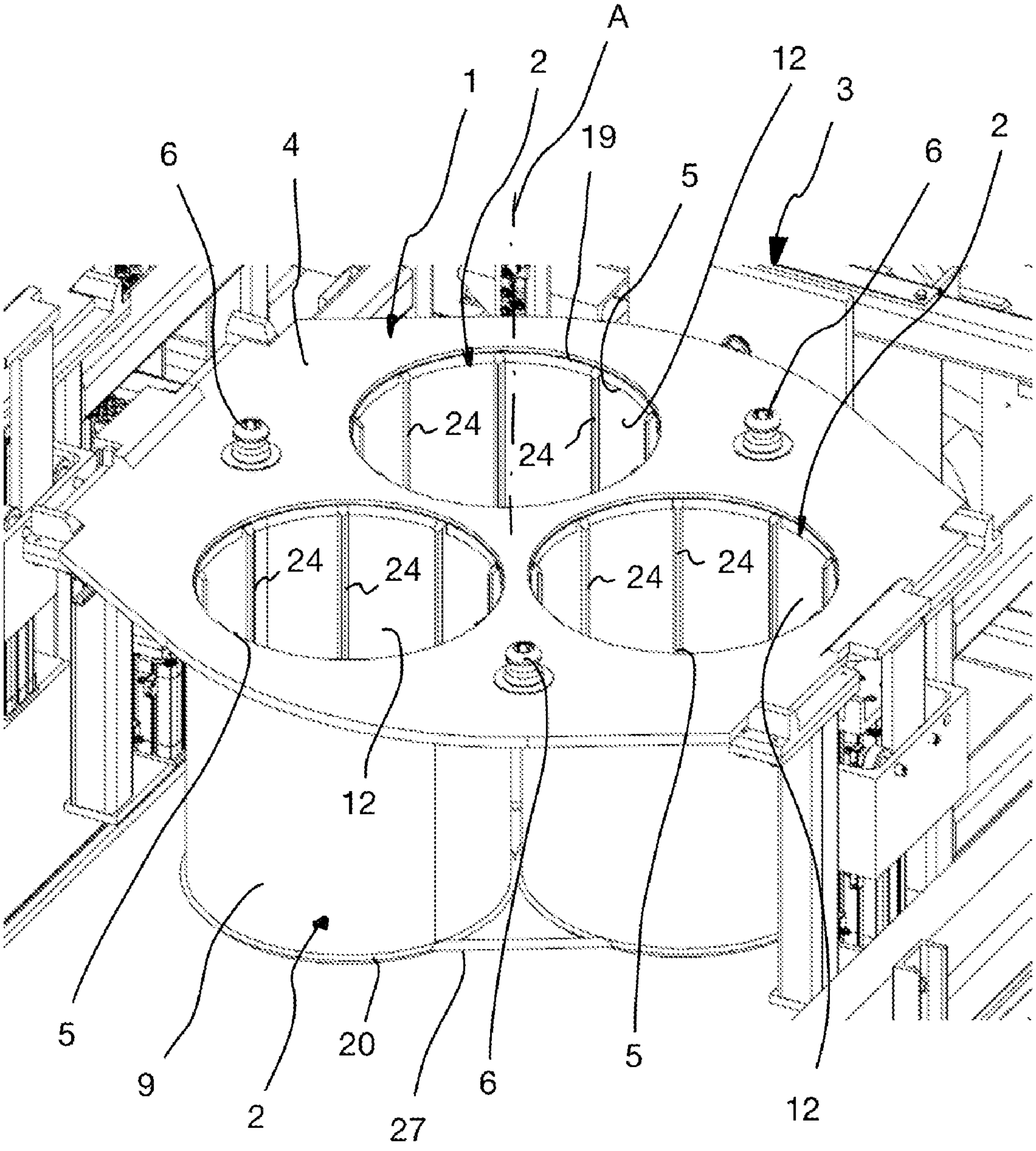
FIG. 8 is a perspective view of the centrifuge basket arrangement of FIG. 1, illustrated with a portion of a handling system according to the teachings of the present disclosure.

FIGS. 1 and 2 show an example centrifuge basket arrangement or assembly 1 including three centrifuge baskets 2 according to one form of the present disclosure. In FIGS. 3 to 7, a centrifuge basket 2 according to the present disclosure is shown in detail. In FIG. 8, the centrifuge basket arrangement 1, with the three centrifuge baskets 2, is shown in a handling system 3 according to the teachings of the present disclosure for transporting the centrifuge basket arrangement 1 between stations of a coating device for treating bulk parts.

The centrifuge basket arrangement 1 shown in FIGS. 1 and 2 has a holding flange 4 which is configured to be rotatable about an axis of rotation A. The holding flange 4 is located in a plane spanned by a spatial direction X and a spatial direction Y. The axis of rotation A runs parallel to a spatial direction Z. The spatial directions X, Y, Z are defined in terms of a Cartesian coordinate system associated with the holding flange 4 and are indicated by respective arrows in FIG. 1.

Three centrifuge baskets 2 according to the teachings of the present disclosure for holding bulk parts are arranged at the holding flange 4. For each centrifuge basket 2, the holding flange 4 has an opening 5 for the bulk parts for filling and emptying the centrifuge baskets 2. The centrifuge baskets 2 are open at their upper sides facing the holding flange 4 and are fastened, e.g., welded, at their upper ends to the holding flange 4.

Three clamping bolts 6 are arranged on the holding flange 4 for reversibly releasably fastening the centrifuge basket arrangement 1 to a basket carrier of a centrifuge system (not shown), which can be one of several stations of the coating device. The clamping bolts 6 are insertable into clamping modules of the basket carrier (not shown) and clampable therein. In one example, the clamping modules can be pneumatically actuated centering clamps, also called zero point clamps.

The configuration of the centrifuge baskets 2 attached to the holding flange 4 is described in more detail below. The centrifuge baskets 2 are identical to one another and are each rotationally symmetrical with respect to their respective basket axis K. The basket axes K run parallel to and radially spaced from the central axis of rotation A of the centrifuge basket arrangement 1, about which the centrifuge basket arrangement 1 is rotatingly drivable. FIGS. 3 to 7 show a centrifuge basket 2 according to the disclosure in greater detail, respectively individual details thereof in enlarged partial representation.

The centrifuge basket 2 includes a cylindrical basket wall 7 running in the circumferential direction around the basket axis K and a basket base 8 at an end of the basket opposite to the opening 5. The basket wall 7 and the basket base 8 have a sandwich-like structure and are configured to be permeable to liquids. Specifically, the centrifuge basket 2 includes a support basket 9 with a support wall 10 extending in circumferential direction about the basket axis K and a support base 11. Furthermore, the centrifuge basket 2 includes a filter fabric 12 with a wall-side fabric portion 13 extending circumferentially around the basket axis K and a base-side fabric portion 14. The filter fabric 12 is arranged in the support basket 9, with the wall-side fabric portion 13 covering the support wall 10 and the base-side fabric portion 14 covering the support base 11 on the inside.

Figure 3:
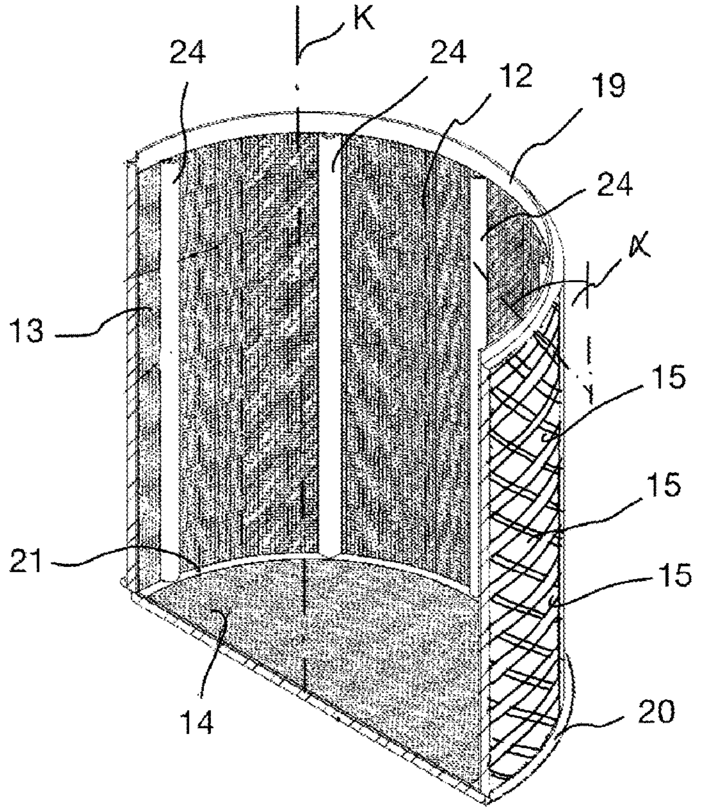
FIG. 3 is a perspective sectional view of one of the centrifuge baskets of FIG. 1.
Figure 4:
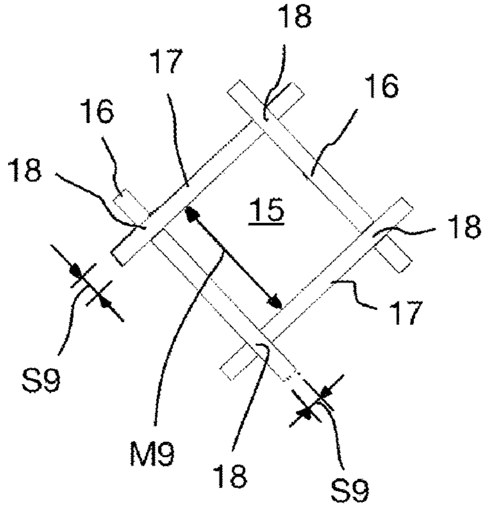
FIG. 4 is a side view of a portion of a support basket of the centrifuge basket of FIG. 3.

The support or stabilizing basket 9 has a plurality of through openings 15 formed in the support wall 10 and in the support base 11. In FIG. 3, for the sake of simplicity, only some of the through openings are provided with the reference sign 15. The through openings 15 each have a passage area of at most 500 square millimeters, which includes that the passage area of the through openings is 500 square millimeters or less on average. Specifically, the support wall 10 and the support base 11 may be made of a coarse-mesh wire mesh. The coarse-mesh wire mesh may have a mesh size M9 and in one form can be of at least 8 millimeters and at most 16 millimeters. In an exemplary form, a wire mesh made of metal can be used in which the mesh size M9 may be approximately 12 millimeters. The wire mesh can be a punched mesh with square meshes, which has first wires 16 and second wires 17. As can be seen in particular in FIG. 4, the wires 16, 17 are woven at cross points 18, pressed and not welded. However, it is also generally possible that the wires 16, 17 are welded together at the cross points 18. The wires 16, 17 have equal wire thicknesses S9, which can be in a range from 2.5 to 6.3 millimeters and, may be approximately 4 millimeters for example.

FIGS. 1 to 3 show that the coarse mesh wire fabric of the support wall 10 is oriented diagonally. In other words, the first wires 16 and the second wires 17 include angles α of between 30 to 60 degrees with respect to a parallel to the basket axis K. For example, the angle may be approximately 45 degrees.

It can be seen that, at an axial end of the support wall remote from the base, the ends of the first wires 16 and the second wires 17 are connected to a ring-shaped metal sheet 19, e.g., by welding. The metal sheet 19 is inserted in the opening 5 of the holding flange 4 and may be welded to the holding flange 4. Additionally or alternatively, the wires 16, 17 may be welded to the holding flange 4. For stiffening the support basket 9, the bottom end of the support wall 10 is embraced by a support ring 20, which is tacked, e.g., welded, to the support wall 10 from radially outside. The support base 11 may be embraced by an annular metal sheet 21 or plate, which may be arranged radially between the support base 11 and the support wall 10 and has a stabilizing effect. The base-side ends of the wires 16, 17 of the support wall 10 and the peripheral ends of the wires of the support base 11 can be connected to the metal sheet 21, e.g., welded. However, it is also possible that the wires 16, 17 of the support wall 10 and the wires of the support base are directly welded to each other, in which case the ring metal sheet 21 could be omitted.

Compared to the coarse-mesh wire fabric of the support basket 9, the filter fabric 12 has a finer mesh. In contrast to the support basket 9, the mesh filter fabric 12 does not assume a support function, but serves for filtration so that the bulk parts received in the centrifuge basket 2 are retained therein during centrifuging and the excess treatment liquid can be removed away to the outside.

Figure 5:
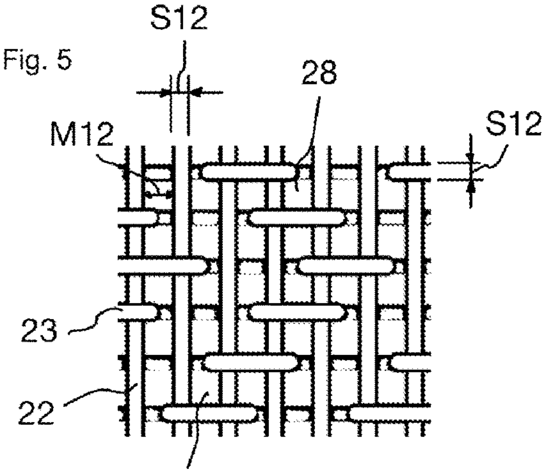
FIG. 5 is a side view of a portion of a filter fabric of the centrifuge basket of FIG. 3.

The filter fabric 12 can have sieve openings, or meshes 28, each with a mesh size M12 of 0.5 to 1.5 millimeters, for example. According to one example, the mesh size M12 of the filter fabric 12 may be approximately 1.0 millimeter. The filter fabric 12 can be a wire fabric, which can be produced, for example, in twill weave, as shown in enlarged partial representation in FIG. 5. The fine-mesh wire fabric has first wires 22 and second wires 23, each having a wire thickness S12 of at least 0.125 millimeter and at most 1.4 millimeter. The wire gauge S12 of the first wires 22 and the second wires 23, can be approximately 1.0 millimeter. The filter fabric 12 is firmly connected to the support basket 9, e.g., welded, and is supported on the latter in a planar manner. For the sake of simplicity, only some of the reference signs 22, 23, 28, S12 are shown in FIG. 5.

Figure 6:
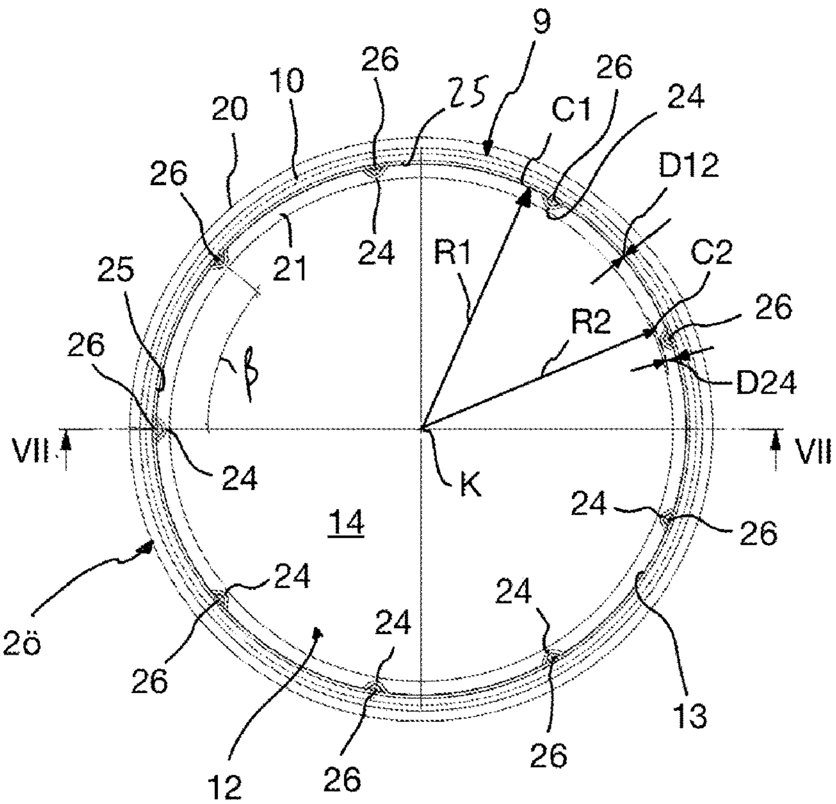
FIG. 6 is a top view of the centrifuge basket of FIG. 3.
Figure 7:
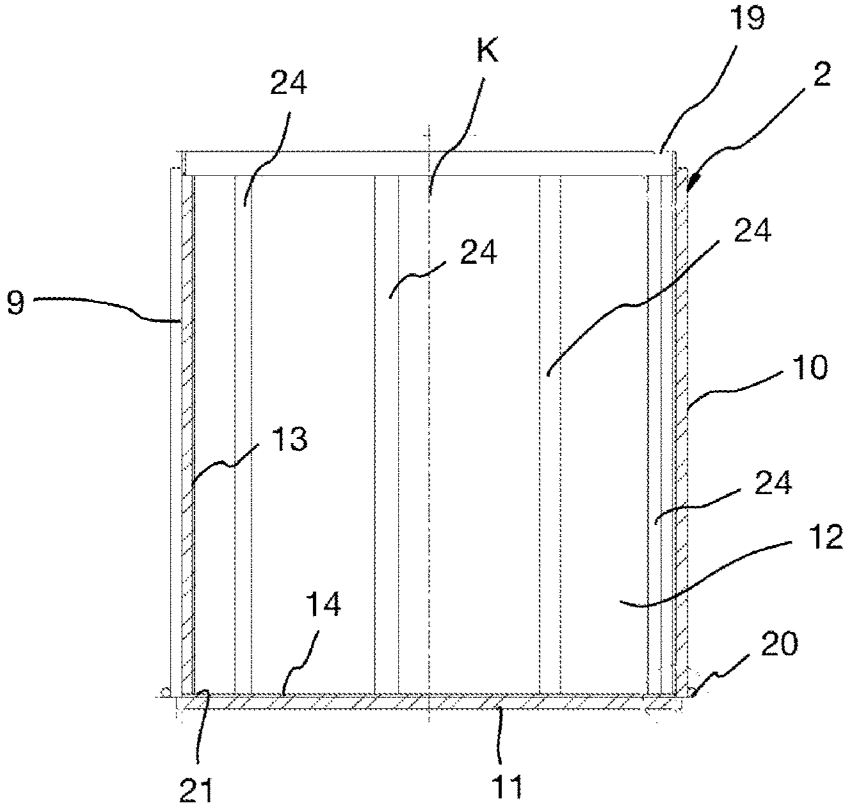
FIG. 7 is a cross-sectional view of the centrifuge basket of FIG. 6 taken along the line VII-VII shown in FIG. 6.

In FIG. 6, it can be seen that the filter fabric 12 has, distributed over the circumference, a plurality of regions 24 projecting radially inwards relative to a circular basic shape, if viewed in a plan view respectively cross-section through the basket 2. The circular basis shape of the filter fabric 12 results from the cylindrical support basket 9, against which the filter fabric 12 rests from the inside and is supported towards the outside. The projecting regions 24 serve as entrainment and/or movement means which entrain and/or move the bulk parts to be treated when the centrifuge basket 2 is rotated. The circular basic shape is defined by an imaginary first circle C1, whose center is on the basket axis K and which has a first radius R1. The filter fabric 12 projects with the regions 24 further into the interior of the basket, wherein the projecting regions 24 end on an imaginary second circle C2, the center of which lies on the basket axis K and which has a second radius R2. The second radius R2 is thus smaller than the first radius R1. The difference between the first radius R1 and the second radius R2 corresponds to the radial extent D24 of the respective protruding region 24. The radial extent D24 can be at least 3 millimeters and at most 50 millimeters, for example.

The projecting regions 24 of the filter fabric 12 may be spaced at regular angular intervals β around the circumference. For example, the angular spacing β between two adjacent projecting regions 24 may be between 10 and 180 degrees. It can be seen in FIG. 6 that the filter fabric 12 has nine projecting regions 24 in this example, with the angular spacing β between two adjacent projecting regions 24 thus being 40 degrees.

The protruding regions 24 are formed in a bead-like or rib-like manner, wherein a thickness D12 of the filter fabric 12 is smaller than the radial extension D24 of the respective protruding region 24. The protruding regions 24 extend in the axial direction and have a length in axial direction which corresponds at least approximately to the height of the supporting wall 10.

A plurality of circumferentially distributed structural elements 26 are arranged on an inner side 25 of the support basket 9, in particular of the support wall 10, to support the protruding regions 24. The protruding regions 24 of the wall-side fabric portion 13 of the filter fabric 12 are supported on the structural elements 26. In the circumferential direction between the structural elements 26, the wall-side fabric portion 13 of the filter fabric 12 is supported on the curved inner side 25 of the support wall 10. Accordingly, the structural elements 26 are arranged radially outside the filter fabric 12, respectively radially between the filter fabric 12 and the support wall 10. Thus, the structural elements 26 lie in the basket wall 7 of the centrifuge basket 2.

The structural elements 26 can be configured as bar profiles. In particular, it can be seen in FIG. 6 that the structural elements 26 can be round profiles. The structural elements 26 can be made of a solid metallic material. The structural elements 26 can be connected to the support wall 10 and the support base 11 at their axial ends, e.g., by welding.

Further, the centrifuge basket arrangement 1 may include support struts 27 that support the bottom ends of the centrifuge baskets 2 against each other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. Centrifuge basket comprising:

a support basket with a support base and a support wall extending circumferentially around a basket axis of the centrifuge basket, wherein the support base and the support wall include a plurality of through openings with passage areas of at most 500 square millimeters, and a filter fabric arranged in the support basket and covering the support base and the support wall inside, wherein the filter fabric includes, viewed in a cross-section through the centrifuge basket, a plurality of raised regions distributed over a circumference of the centrifuge basket which are formed radially inwards with respect to an overall circular shape of the filter fabric.

2. The centrifuge basket according to claim 1, wherein the raised regions form ribs.

3. The centrifuge basket according to claim 1, wherein a thickness of the filter fabric is smaller than a radial extension of each raised region.

4. The centrifuge basket according to claim 1, wherein the raised regions extend in an axial direction of the support wall.

5. The centrifuge basket according to claim 4, wherein an axial extension of each raised region is greater than 0.5 times an axial extension of the support wall.

6. The centrifuge basket according to claim 1, wherein a plurality of structural elements are arranged circumferentially distributed on an inner side of the supporting wall, wherein the raised regions of the filter fabric are formed and supported by the structural elements.

7. The centrifuge basket according to claim 6, wherein the structural elements are arranged radially outside the filter fabric.

8. The centrifuge basket according to claim 6, wherein the structural elements are arranged radially between the filter fabric and the support wall.

9. The centrifuge basket according to claim 6, wherein the structural elements are configured as bar profiles.

10. The centrifuge basket according to claim 1, wherein the filter fabric is firmly connected to the support basket.

11. The centrifuge basket according to claim 1, wherein the filter fabric has a mesh size of 0.5 to 1.5 millimeters and a wire thickness of 0.125 to 1.4 millimeters.

12. The centrifuge basket according to claim 1, wherein the support wall and the support base are made from coarse meshed wire fabric with a mesh width of 8 millimeters to 16 millimeters.

13. The centrifuge basket according to claim 12, wherein the coarse meshed wire fabric is a punched mesh.

14. The centrifuge basket according to claim 12, wherein the coarse meshed wire fabric of the support wall includes first wires and second wires, with the first wires and the second wires enclosing angles of 30 to 60 degrees with respect to an axis parallel to the basket axis.

15. The centrifuge basket according to claim 1, wherein the support basket has a support ring connected to the support wall at a level of the support base, and wherein the centrifuge basket has a holding flange with an opening for loading and unloading the centrifuge basket with bulk parts.

* * * * *